Nov. 19, 1968  H. F. SHERWOOD  3,412,244
FOLDED FLEXIBLE VACUUM EXPOSURE HOLDER FOR RADIOGRAPHY
Filed Jan. 17, 1966  2 Sheets-Sheet 1
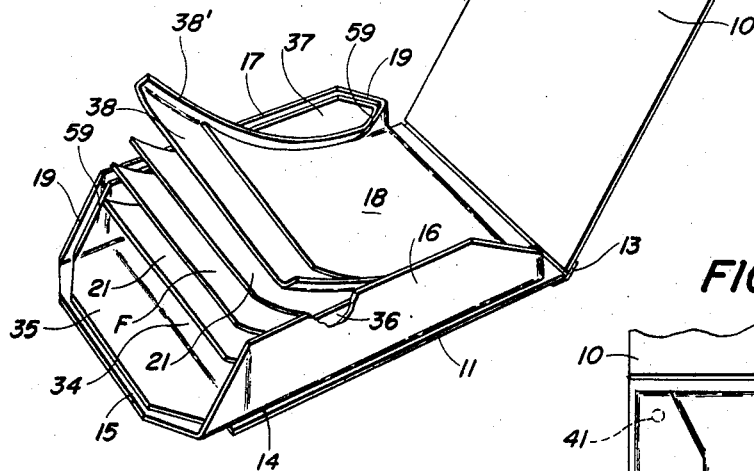
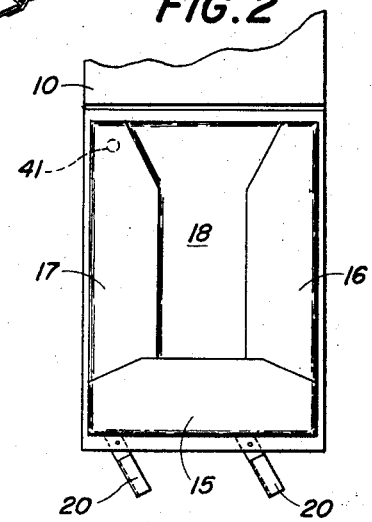
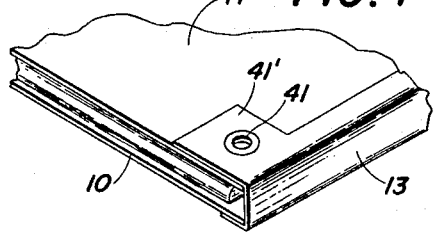
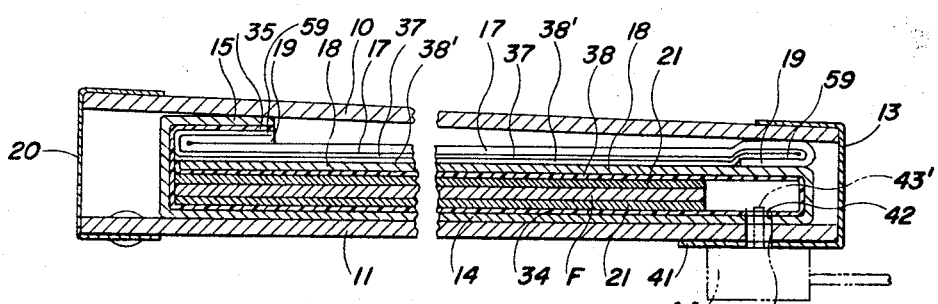
HAROLD F. SHERWOOD
INVENTOR.
BY
ATTORNEYS Nov. 19, 1968　　　H. F. SHERWOOD　　　3,412,244
FOLDED FLEXIBLE VACUUM EXPOSURE HOLDER FOR RADIOGRAPHY
Filed Jan. 17, 1966
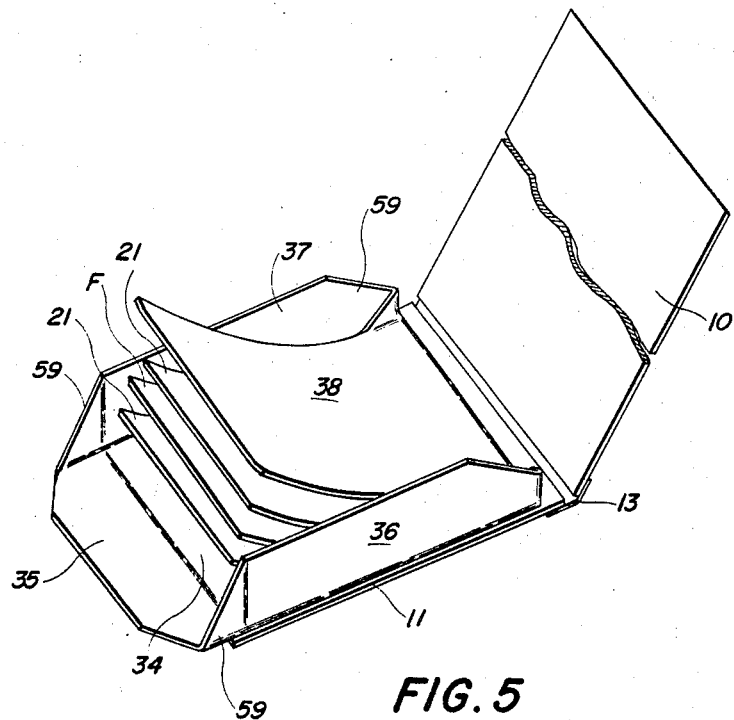
FIG. 5
FIG. 6
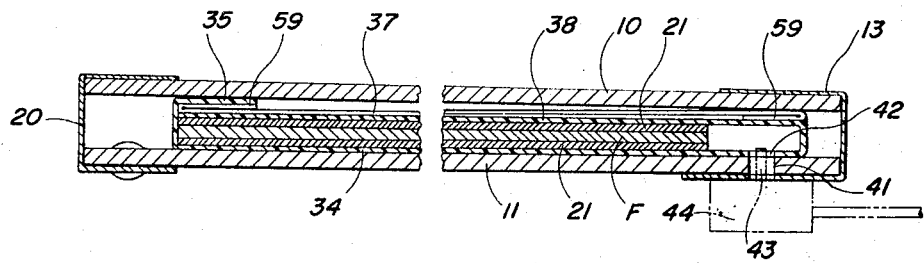
HAROLD F. SHERWOOD
INVENTOR.
ATTORNEYS

United States Patent Office 3,412,244
Patented Nov. 19, 1968

3,412,244
FOLDED FLEXIBLE VACUUM EXPOSURE
HOLDER FOR RADIOGRAPHY
Harold Frank Sherwood, West Bloomfield, N.Y., assignor to Eastman Kodak Company, Rochester, N.Y., a corporation of New Jersey
Filed Jan. 17, 1966, Ser. No. 520,924
4 Claims. (Cl. 250—68)

ABSTRACT OF THE DISCLOSURE

A reloadable X-ray film holder comprising a foldable envelope into which a sheet of film and an intensifying screen are placed in face-to-face relation for exposure, said envelope being made of a very flexible plastic material, two overlapping layers of which will form an airtight seal when they are pressed firmly into face-to-face contact with one another, and means being provided to evacuate said envelope after the flaps thereof have been folded around the edges of the film and screen and into surface contact with one another.

---

This invention relates to an improved exposure holder for radiographic use, and more particularly to such a holder which will provide improved contact between X-ray intensifying screens and an X-ray film contained therein.

Foldable cardboard X-ray film exposure holders are used quite extensively in the art for radiography because they are lightweight, easy to load, and are relatively inexpensive. They have the disadvantage, however, that it is difficult, if not impossible, to obtain uniform contact between the film and the surface of an X-ray intensifying screen or screens positioned in face-to-face contact with the film. For this reason they are generally not used when exposures requiring intensifying screens are to be made.

Light from fluorescent intensifying screens in such a holder, when in face-to-face contact with the film, furnishes practically all of the exposure in the majority of medical radiographs. If either the front or back screen, if two are used, on opposite sides of the film, do not make perfect contact with the film some of the light can spread before reaching the film. This results in a somewhat blurred image. Thus, good contact between the film and screens is essential for the best image quality, but attaining it has been a problem ever since the beginning of radiography. Maintaining screen-to-film contact is also a problem in industrial radiography where lead intensifying screens provide a large fraction of the radiographic image.

Mechanical methods such as multiple latches, special padding, stiffer fronts and covers have never completely solved this problem. Conventional X-ray cassettes require superb mechanical action and substantial rigidity in order to insure good film-to-screen contact. The rigidity required, therefore, results in considerable weight. The springs which are attached to the cover are often too weak to provide the best contact. With these requirements imposed upon the design, the cassettes are necessarily heavy and as a result are oftentimes dropped, thus suffering damage.

The use of a vacuum system to provide good contact between the film and the screens has been appreciated and has been suggested for use with X-ray cassettes for some time. However, there are no known commercial units available today. The virtue of a vacuum system to provide good contact is that atmospheric pressure on one side of the cassette is in equilibrium with that on the other side. Therefore, the cassette itself does not need to be especially rigid and can be light in weight. Known designs of X-ray cassettes using a vacuum system to insure good film-to-screen contact are quite expensive and heavy. In order to provide a lightweight film-screen compartment which can be readily evacuated, the film and screens can be contained within an envelope which is made air tight by sealing the edges thereof by means of heat sealing, adhesives, etc., and for which a means is provided of attaching a vacuum pump. Such a cassette as last mentioned is not one which can be readily reloaded with film and screen for repeated use.

It is a principal object of the present invention to improve the conventional foldable cardboard X-ray film exposure holder so that a vacuum system may be used to provide good contact between a sheet of film and screens loaded thereinto.

A further object is to provide an improved cardboard X-ray exposure holder which retains its reloadable characteristic even though the film and screens are contained within an envelope which can be evacuated.

And still another object is to provide an X-ray film holder comprising a foldable envelope into which the film and screens are placed in face-to-face contact for exposure, said envelope being made of very flexible plastic material, two overlapping layers of which will form an air-tight seal when they are pressed firmly into face-to-face contact with one another, and means being provided to evacuate said envelope after the flaps thereof have been folded around the film and screens and into surface contact with one another. If desired the plastic material from which the envelope is made may be opaque to light rays to which the film is sensitive, or the usual light opaque paper envelope used with conventional foldable X-ray exposure holders may be used to protect the film from exposure to light rays and the plastic envelope then may be transparent and inserted as a liner within said paper envelope to permit the use of a vacuum system to evacuate said liner.

The novel features that I consider characteristic of my invention are set forth with particularity in the appended claims. The invention itself, however, both as to its details of construction and its methods of operation, together with additional objects and advantages thereof, will best be understood from the following description when read in connection with the accompanying drawing in which:

FIG. 1 is a perspective view of one embodiment of my invention, and showing how the exposure holder is loaded with a sheet of film and two intensifying screens, FIG. 2 is a plan view of the embodiment shown in FIG. 1, and illustrating how the paper and plastic envelopes will appear when folded closed but with cardboard members still in their open position, FIG. 3 is a longitudinal cross section, on a greatly enlarged scale, of the exposure holder in its completely assembled condition, and showing how vacuum may be used to evacuate the plastic liner or envelope, FIG. 4 is a partial perspective of the assembled exposure holder showing the exhaust port in one of the cover members, FIG. 5 is a perspective view of a second embodiment of my invention, and FIG. 6 is a longitudinal cross section, on an enlarged scale, of the second embodiment in its completely assembled condition.

Referring to FIG. 1, the conventional foldable X-ray exposure holder may be one of the type disclosed in U.S. Patent 1,367,601 and which consists of two cover members of cardboard or other light weight inexpensive material which constitute a cover member 10 and a black member 11. These members are joined at one end by any type of hinge, as for example, the flexible connection 13. These cover members are opaque to light rays but are uniformly pervious to X-rays. It is important that the composition of the material from these cover and back members are made be very uniform so that the X-rays may pass through all positions thereof with equal ease to avoid mottling the film contained within. If desired, they may be waterproofed.

Upon the back member 11 there is adhesively attached a paper envelope comprising a substantially rectangular sheet 14 having integral therewith flaps 15, 16, 17 and 18. These flaps are connected by gussets 19 at the corners so that when the flaps are folded inwardly it will be impossible for light to enter the envelope at these corners. The end flap 15 and the side flaps 16 and 17 are relatively narrow. As the flap 18 is made longer than the others and folds down upon sheet 14 so as to fill the space between flaps 16 and 17, the narrow flaps may then be folded over this cover flap and the envelope will then be rendered light-tight, see FIG. 2. The envelope is made of strong paper which is impervious to light rays but uniformly previous to X-rays. In order to hold the holder tightly closed any desired type of catch or fastener may be used. Such a fastener may consists of a channel shape member 20 pivoted to the back member to swing into overlapping relation with the free end of the cover member to hold the two members enclosed or folded relation.

In use, a sheet of X-ray film F, with suitable intensifying screen or screens 21 in face-to-face contact with one or both sides thereof, is placed upon the rectangular sheet 14 of the envelope, the cover flap 18 is folded down thereover, and then the flaps 15, 16, and 17 are folded inwardly and down over the cover flap 18. The back member 11 and cover member 10 are then folded together and secured by fastener 20. After this loading operation is performed in a dark room, the loaded holder is taken into the light where the exposure is to be made.

While this type of X-ray exposure holder possesses many advantages, e.g., inexpensive, lightweight, readily loaded and unloaded, etc., it has the disadvantage that the film and screens are not positively maintained in intimate contact during the exposure as is necessary for obtaining the best image on the film. The present invention concerns modifying the conventional holder disclosed in such a way that vacuum can be used to force the screens and film into intimate face-to-face contact without sacrificing any of the advantages of the disclosed holder.

In accordance with one embodiment of the present invention a liner of very flexible air-ight material, e.g., plastic sheeting, is applied to the inside of the paper envelope within the cardboard cover members. This liner may be substantially the same configuration as the paper envelope and consists of a substantially rectangular sheet 34 having integral therewith flaps 35, 36, 37 and 38 superposed upon the corresponding sheet 14 and flaps 15, 16, 17 and 18 of the paper envelopes. The flaps of this liner are connected at their corners by gussets 59 so that when the flaps are folded inwardly an airtight enclosure will be provided by the liner by virtue of the fact that layers of the plastic liner will come into face-to-face contact entirely around the entire edge of the film and screens. For maintaining the plastic liner in proper superposed position within the holder, the rectangular sheet 34 thereof may be adhesively attached to the rectangular sheet 14 of the paper envelope by spot tacking. The flaps of the paper envelope and the plastic liner should not be adhesively joined, especially near the folds thereof, for reasons which will be set forth below. The flap 38 of the plastic liner is slightly wider and longer than the flap 18 of the paper envelope so as to provide flexible lips 38' which embrace the three edges of a flap 18 when the latter is folded down onto flap 38.

In loading the X-ray holder, a sheet of X-ray film F and one or more intensifying screens 21 are first placed in superposed relation on the rectangular sheet 34 of the liner carried by the back member 11. Then the flap 38 of the liner and the flap 18 of the paper envelope are folded down into the top of the stack of film and screens. Then the flaps 35, 36, and 37 of the liner and flaps 15, 16, and 17 of the paper envelope are folded inwardly over and onto flaps 38 and 18. During this latter operation the flexible lip 38' of the flap 38 will be turned up and over the edges of flap 18 and the flaps 35, 36, and 37, along with the gusset 59, not attached to the paper envelope at the corner of the folds, come into face-to-face contact with this lip 38' and by reason of their very flexible nature form a vacuum seal, see FIG. 3. The package will now appear as shown in FIG. 2. The next step is to fold the cover member 10 down onto the back member 11 and the clips 20 are then pivoted to their closed position to hold the exposure holder closed and ready for exposure. FIG. 3 shows, on a greatly enlarged scale, what the completely assembled holder will consist of.

At the time an exposure is to be made the exposure holder can be evacuated by the application of a technique similar to that disclosed in my pending U.S. application Ser. No. 403,572 filed Oct. 13, 1964. According to this technique a vacuum cup indicated at 44 containing means for partially or totally evacuating the inner plastic liner is positioned on the outside of the exposure holder. The corner of the cardboard member 11 is provided with an exhaust port 41 in covering relation with which the vacuum cup is placed. To insure the cup member of the vacuum cup making a good air-tight seal with the exposure holder when it is mounted thereon the exhaust port 41 is surrounded by a patch 41' of material which is impervious to the passage of air and provides a smooth surface onto which the vacuum cup is mounted. As shown, this patch 41' may comprise an extension of the flexible hinge 13, see FIG. 4. If the vacuum cup is provided with a tube 43', as indicated in FIG. 3, the paper and plastic envelops should be provided with openings designated at 42 which line up with the exhaust port 41 to permit air to be pumped from the interior of the plastic liner when the vacuum cup is placed on the exposure hold over the exhaust post. If the use to which this exposure holder is to be put requires that the exhaust post 41 be light tight it can be made so that any light entering it will be baffled out before it reaches the film.

An additional modification to facilitate rapid evacuation of the liner envelope comprise inducing into the holder a rough surface material, such as cheesecloth or a rough homogeneous metal free paper (or the like) so that air will not be trapped by an irregularity (wrinkle or fold) in the flexible liner engaging the surface of the contents of the envelope. It is advantageous to insert it between the screen and the plastic liner on the side where the exhaust port is located.

A further, and more simplified modification of the holder can be obtained if the plastic liner envelope is made opaque to light rays to which film is sensitive but is pervious to X-rays. Then the paper envelope can be dispensed with since the plastic envelope or liner will supply the protection for the film which was provided by the paper envelope in the first disclosed embodiment. Any very flexible material which is opaque to light rays, is airtight, is free from heavy elements, e.g., Cl or S atoms, and is also compatible with photographic film, can be used as the liner of the holder. An example of one material which has been found satisfactory as a liner is 0.003 inch thick black polyethylene plastic sheeting. The thickness of the flexible sheet has been found to be of little importance as long as it is extremely flexible and nonporous. Such an embodiment is disclosed in FIGS. 5 and 6 and from an inspection of which it will be seen that this embodiment differs from that first disclosed only in that the paper envelope has been dispensed with. In this embodiment the rectangular sheet 34 of the plastic liner or envelope is adhesively attached to the cardboard member 11 at one or more points, excluding at the folds in the flaps of the liner, in order to maintain the liner in proper position on the member at all times when the holder is open.

It is preferred that the exhaust port 41 be located on the holder to be in a position back of the radiographic film during exposure so that a radiographic image of the vacuum probe will not be recorded on the film. However, the exhaust port could be on the front side of the holder if a name clip or lead blocker is desired to provide an identification area on the film. The clip or lead blocker could be designed to act as the vacuum cup and thereby allow it to be placed on the front side of the holder without interferring with the useful area of the radiograph. It is also preferable that the exhaust port in the cover member of the holder be light tight, but this is not an essential feature when opaque backed fluorescent screens or lead intensifying screens such as used in industrial radiography are used in the holder.

From the foregoing description it will be seen that I have modified a conventional inexpensive X-ray exposure holder in such a manner that it can be readily evacuated so as to produce intimate contact between the film and intensifying screen or screens carried thereby. By this modification, such conventional X-ray exposure holders are adapted for the use of intensifying screens whereas before this invention they were generally used only with a sheet of X-ray film. In addition, modification of the conventional X-ray holder of the type in question can be readily accomplished by the owners of such holders with little added expense and without destroying the reloadable features of such holders.

I claim:
1. An X-ray exposure holder for confining a sheet of X-ray film and at least one intensifying screen in intimate face-to-face contact during exposure of the film and comprising:
(a) a pair of cover members hingedly connected at one end, said cover members being of a material opaque to light rays but pervious to X-rays;
(b) a foldable envelope secured to the inner surface of one of said cover members to be sandwiched between the cover members when they are in a closed position; said envelope being of flexible, airtight plastic material and including
(1) four flaps defining an enclosure for receiving said sheet of X-ray film and intensifying screen in face-to-face relation;
(2) one of said flaps being shaped to fit between the other flaps and substantially cover the enclosure when folded inwardly and the remaining flaps being folded inwardly in overlapping relation with said one flap;
(c) means to hold said cover members together; and
(d) one of said cover members having an exhaust port communicating with the interior of the envelope for attachment to air evacuating means for evacuation of air from the interior of the envelope.
2. An X-ray exposure holder according to claim 1, in which said plastic material from which said envelope is made is opaque to light rays to protect said X-ray film from exposure to light rays.
3. An X-ray exposure holder according to claim 1, in which the wall of said envelope adjacent the cover member having said exhaust port is also provided with an exhaust port in communication with which said air evacuating means is placed.
4. An X-ray exposure holder according to claim 1, including a sheet of rough surfaced material inserted between the wall of said envelope and the contents thereof on the side having the exhaust port to prevent air from being trapped in said envelope by irregularities in the wall of the envelope engaging a surface of the contents of the envelope.

References Cited

UNITED STATES PATENTS 2,590,892  4/1952  Reuter _____ 250—68
2,925,761  2/1960  Peary et al. _____ 250—68

ARCHIE R. BORCHELT, *Primary Examiner.*

A. L. BIRCH, *Assistant Examiner.*